United States Patent
Heile et al.

(10) Patent No.: US 11,401,967 B2
(45) Date of Patent: Aug. 2, 2022

(54) BEARING UNIT AND METHOD FOR MANUFACTURING A BEARING UNIT

(71) Applicant: AKTIEBOLAGET SKF, Gothenburg (SE)

(72) Inventors: Andreas Heile, Bad Kissingen (DE); Sebastian Kraus, Schwanfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/221,103

(22) Filed: Apr. 2, 2021

(65) Prior Publication Data

US 2021/0317871 A1 Oct. 14, 2021

(30) Foreign Application Priority Data

Apr. 9, 2020 (DE) .................. 102020204579.8

(51) Int. Cl.
| | |
|---|---|
| *F16C 25/08* | (2006.01) |
| *F16C 33/58* | (2006.01) |
| *F16C 17/02* | (2006.01) |
| *F16C 33/64* | (2006.01) |
| *F16C 19/16* | (2006.01) |
| *F16C 19/10* | (2006.01) |

(52) U.S. Cl.
CPC .............. *F16C 17/02* (2013.01); *F16C 19/10* (2013.01); *F16C 19/163* (2013.01); *F16C 19/166* (2013.01); *F16C 25/083* (2013.01); *F16C 33/586* (2013.01); *F16C 33/64* (2013.01); *F16C 2226/74* (2013.01); *F16C 2380/26* (2013.01)

(58) Field of Classification Search
CPC ........ F16C 19/20; F16C 19/16; F16C 19/163; F16C 19/166; F16C 25/083; F16C 33/586; F16C 33/64; F16C 2226/74; F16C 2380/26; F16F 1/32; F16F 1/328
See application file for complete search history.

(56) References Cited

U.S. PATENT DOCUMENTS 7,038,340 B2 * 5/2006 Ihata .................... H02K 5/1732
310/90

FOREIGN PATENT DOCUMENTS

| DE | 7738870 U1 | 3/1978 | |
|---|---|---|---|
| DE | 4008509 A1 * | 9/1991 | |
| DE | 102010026399 B3 * | 12/2011 | ........... F16D 13/648 |
| DE | 102014216506 A1 | 2/2016 | |
| EP | 2682636 A1 * | 1/2014 | ........... F16C 19/163 |
| FR | 2746470 A1 * | 9/1997 | ........... F16D 23/144 |
| JP | S4822988 Y1 | 7/1973 | |
| JP | 2008175337 A * | 7/2008 | |
| WO | WO-2015043630 A1 * | 4/2015 | ........... F16C 25/083 |

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A bearing unit has at least one outer ring and at least one spring unit mounted axially adjacent to the at least one outer ring and connected to the at least one outer ring by a snap fit. The spring unit includes a support element having a connecting element such as a rib or a plurality of lugs, for connecting the support element to the bearing outer ring and a wave spring fastened to the support element.

17 Claims, 4 Drawing Sheets

BEARING UNIT AND METHOD FOR MANUFACTURING A BEARING UNIT

CROSS-REFERENCE

This application claims priority to German patent application no. 10 2020 204 579.8 filed on Apr. 9, 2020, the contents of which are fully incorporated herein by reference.

TECHNOLOGICAL FIELD

The disclosure is directed to a bearing unit that includes a bearing inner ring, a bearing outer ring and a spring connected to the bearing outer ring.

BACKGROUND

DE 10 2014 216 506 A1 disclose a bearing unit that includes at least one outer ring and at least one spring unit, which spring unit is disposed at least partially adjacent to the outer ring with respect to an axial direction of the outer ring. From the publications DE 7738870 U and JP S48-22988 Y1 further bearing units are known that include elements that abut against bearings.

SUMMARY

An aspect of the disclosure is to provide a bearing unit of the above-described type, which bearing unit has a cost-effective design and is adaptable.

The disclosure emanates from a bearing unit including at least one outer ring and at least one spring unit, which spring unit is disposed adjacent to the outer ring at least partially with respect to an axial direction of the outer ring.

The spring unit is snapped onto a radially outer-lying region of the outer ring and includes at least one wave spring (also known as a flat wire compression spring). A cost-effective design and a high flexibility of the bearing unit are thereby achieved. In particular, due to the use of a wave spring a compact design is furthermore achieved, so that sufficient installation space is available for the use of standard seals for sealing the bearing unit, whereby a cost-effective design is achieved. In particular, attaching the spring unit by snapping it onto the outer ring allows attachment elements of the spring unit and attachment elements of the outer ring, which allow the attaching of the spring unit onto the outer ring by snapping, to be formed with relatively low geometric precision, since the spring unit need only be captively attached to the outer ring. In particular, a high adaptability is achieved, since a snap connection between the outer ring and the spring unit is releasable in a destruction-free manner, and therefore the spring unit is replaceable by a different spring unit, in particular having a different spring characteristic curve and/or different dimensions, such as in particular a different extension length in the axial direction, wherein due to the destruction-free removability from the outer ring, the replaced spring unit is reusable, whereby costs are saved.

The spring unit is preferably free of regions that are disposed in a spatial region between the outer ring and an inner ring of the bearing unit. Particularly cost-effective seals can thereby be used for the sealing of the bearing unit, which seals are produced in large quantities.

When viewing the bearing unit in an axial direction looking toward the spring unit, the spring unit advantageously covers at most 70%, preferably of at most 40%, and particularly preferably of at most of 10%, of an intermediate space wherein the intermediate space exists on an end side of the bearing unit between the outer ring and an inner ring of the bearing unit. Particularly cost-effective standard seals can thereby be used to seal the bearing unit and it can be installed in a particularly simple manner.

Furthermore, the spring unit may include at least one carrier element and/or a carrier metal plate, which includes at least one snap-connection element and to which at least one wave spring of the spring unit is attached. In this way a constructively simple design can be achieved. The carrier metal plate and the at least one wave spring are preferably configured one-piece and/or made of a casting, whereby a simple manufacturability can be achieved. The carrier element can preferably be an injection molded part that is preferably made of plastic, in particular PA46 and/or PA66 and/or polyether ether ketone.

The wave springs are preferably configured multi-step. Spring units having very specific spring forces, spring deflections, and spring characteristic curves can thereby be manufactured particularly cost-effectively.

A snap connection existing between the outer ring and the spring unit is advantageously configured fully formed with respect to a circumference of the outer ring. In this way a particularly secure snap connection can be achieved.

In addition, a snap connection between the outer ring and the spring unit may include a plurality of snap lugs of the spring unit, which snap lugs are spaced from one another in the circumferential direction of the outer ring; the snap lugs are snapped into a groove of the outer ring. A simple manufacturability, a simple installation, and a simple removal can thereby be achieved.

A wave spring of the spring unit is preferably welded to a carrier metal plate of the spring unit, whereby a simple and cost-effective manufacturability is achieved.

Another aspect of the disclosure comprises a bearing unit having at least one outer ring and at least one spring unit mounted axially adjacent to the at least one outer ring. The spring unit includes a wave spring connected to the at least one outer ring by a snap fit.

A further aspect of the disclosure comprises a bearing unit having at least one outer ring. The outer ring has a radially outer surface and a circumferentially extending groove in the outer surface. At least one spring unit is formed from a wave spring welded to an annular disk having a flange. The flange has a radially inwardly extending rib or a plurality of lugs, and the rib or lugs project into the circumferential groove to connect the at least one spring unit to the at least one outer ring with a snap fit.

Furthermore, a device including a bearing unit as described above may be part of a rotor of an electric motor or a rotor of a generator, wherein the bearing unit at least partially supports the rotor. A high installation flexibility in a final installation is thereby achieved.

Furthermore, a method is provided for manufacturing a bearing unit, wherein a bearing is fully greased and sealed, and thereafter a spring unit, in particular a spring unit as described above, is snapped onto an outer ring of the bearing. A cost-effective manufacturability and design and a high flexibility are thereby achieved. In particular, it is advantageous that the installation of the spring unit need not be effected at a location at which the bearing is manufactured.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 1:
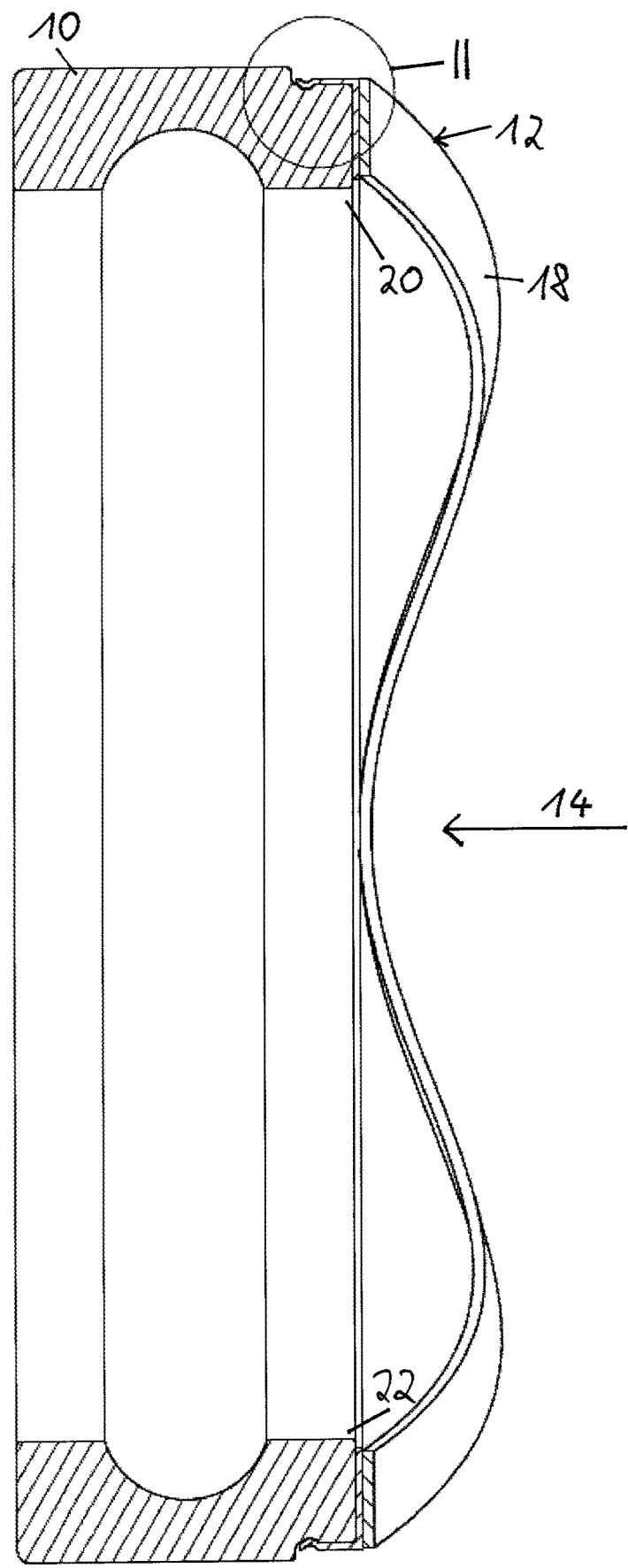
FIG. 1 is an axial section through a part of an bearing unit according to an embodiment of the present disclosure.
Figure 2:
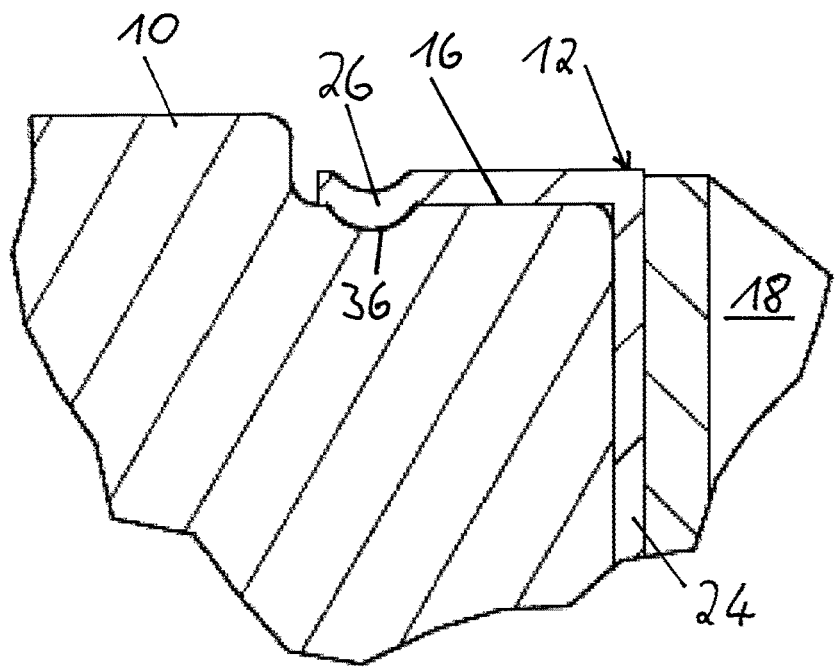
FIG. 2 is an enlarged view of partial region II in FIG. 1.

FIG. 1 is a sectional view through a part of a bearing unit. The bearing unit includes an outer ring 10 to which a spring unit 12 is attached. Relative to an axial direction of the outer ring, the spring unit is disposed partially adjacent to the outer ring. A radially outer surface of the outer ring 10 includes a region 16 (FIG. 2) to which the spring unit 12 is attached, specifically, snapped, to connect it to the outer ring 10. The spring unit 12 includes a carrier metal plate 24 having a snap-connection element 26 in the form of a radially inwardly extending rib. The snap-connection element 26 engages into a radially outwardly lying groove 36 of the outer ring 10, whereby the carrier metal plate 24 and thus the entire spring unit 12 is axially attached to the outer ring 10 in an interference-fit manner. The carrier metal plate 24 is rotationally symmetric with respect to a central axis of the outer ring 10, which central axis extends in the axial direction of the outer ring 10. A snap connection that is achieved by the groove 36 and the snap-connection element 26 is fully formed with respect to a circumference of the outer ring 10; that is, it extends completely around the outer ring 10. The carrier metal plate, or at least the snap-connection elements 26, are formed from a material, such as metal, that is sufficiently resilient to allow the snap connection elements 26 to deform and enter the groove 36 to retain the spring unit 12 on the outer ring with the snap fit.

A wave spring 18 of the spring unit 12 is fixedly welded on an end side of the carrier metal plate 24, which has only surface extension directions, which extend in the radial direction and circumferential direction of the outer ring. In an axial section through the spring unit, the carrier metal plate includes a leg extending in the radial direction, onto which leg the wave spring 18 is fixedly welded, and further includes a leg extending away from the wave spring in the axial direction, which leg includes the snap element 26. The carrier metal plate 24 is thus an annular member overlying an axially facing side of the outer ring and an axially extending flange that overlies a radially outer surface of the outer ring 10. Both legs abut against the outer ring. The outer ring includes a step or stepped portion at an axial edge thereof, and the region 16 is located on this step. The step extends around the entire circumference of the outer ring and extends radially outward starting from the region 16 and the groove 36.

The spring unit 12 is free of regions that are disposed in a spatial region 20 radially between the outer ring 10 and an inner ring (not shown) of the bearing unit. That is, the inner opening of the spring unit is larger than the inner opening of the outer ring such that no portion of the spring unit extends radially inward of the inner diameter of the outer ring. Furthermore, in a view of the bearing unit in an axial direction 14 of the bearing unit on the spring unit, the spring unit does not even partially cover an intermediate space 22 that exists on an end side of the bearing unit between the outer ring and an inner ring of the bearing unit. Overall, a very cost-effective standard seal (not shown) that are produced in very large quantities is usable for sealing the bearing unit, in particular on the axial side on which the wave spring 18 is disposed, and is installable in the bearing unit.

The snap connection between outer ring 10 and spring unit 12 is releasable in that the outer ring is fixedly held and a force is exerted on the spring unit in the axial direction away from the outer ring such that the snap connection is released and the spring unit is moved away from the outer ring. Here the connecting element of the spring unit 12 is only elastically deformed. Overall, neither the spring unit nor the outer ring is destroyed.

A further advantage of the depicted embodiment is that the spring unit and the bearing can be manufactured by different companies. It is furthermore advantageous that only low development effort is needed, since no demands are made on the snap connection since it need not be fixed, but rather can have clearance. Turned surfaces are sufficient here.

Furthermore, in the depicted embodiment it is advantageous that a seal, which seals the intermediate space between the outer ring and the inner ring on the axial side on which the spring unit is disposed, is not directly connected to the spring unit. The seal and the spring unit can thereby be manufactured by different manufacturers.

The bearing unit can also be introduced into existing applications, since there are no specific requirements with respect to a radial construction height, and different spring strengths can be easily realized.

In the present exemplary embodiment the bearing unit comprises a deep groove ball bearing. However, the invention can also be realized with other bearings, such as in particular with angular contact ball bearings or also axial ball bearings.

The bearing unit is preferably used as a non-locating bearing and preloads a bearing system. The bearing unit can be part of a device that includes a rotor of an electric motor or a rotor of a generator, wherein the bearing unit is then at least involved in supporting the rotor. The device can be part of an automobile and particularly preferably of an electric car. In principle, however, it is conceivable that the device is also used in other applications having axial preload.

In the manufacturing of the bearing unit, the bearing that includes the outer ring and the inner ring is first fully greased and sealed, and then the spring unit is snapped onto the outer ring. The resulting unit can be installed efficiently in a subsequent installation, since here the bearing and the spring unit need not be individually handled and installed.

The advantage in the use of the wave spring is that it has an approximately constant spring force over a wide spring path. In comparison to a coil spring and a cup spring, a wave spring has an almost linear spring characteristic curve.

In principle, it is conceivable that the wave spring is configured multi-step.

Figure 3:
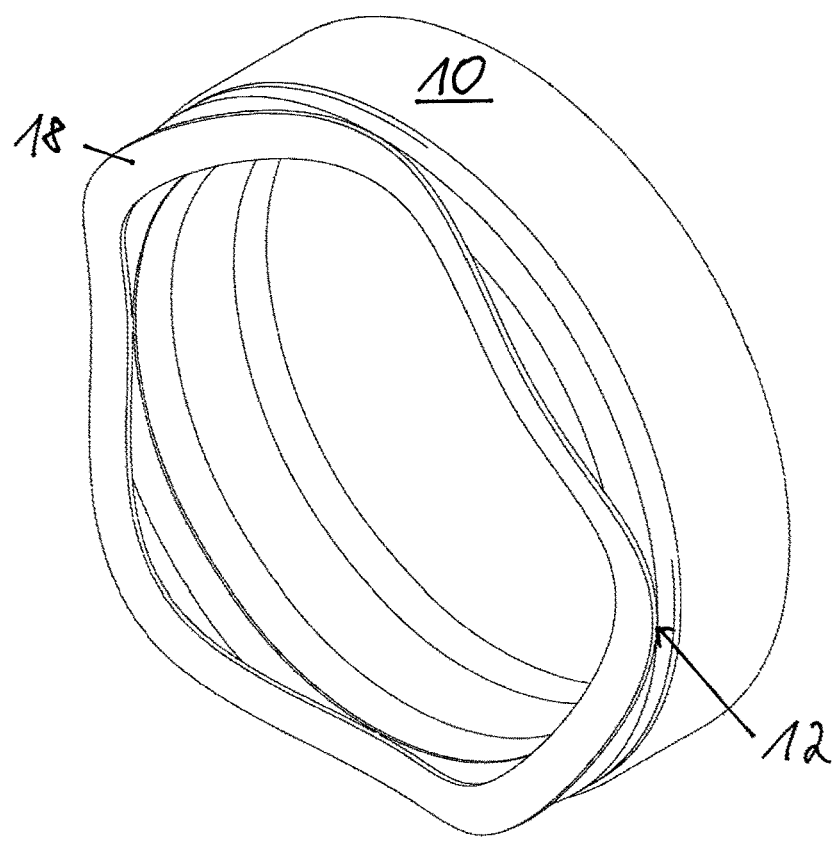
FIG. 3 is a perspective view of the part of the bearing unit of FIG. 1.
Figure 4:
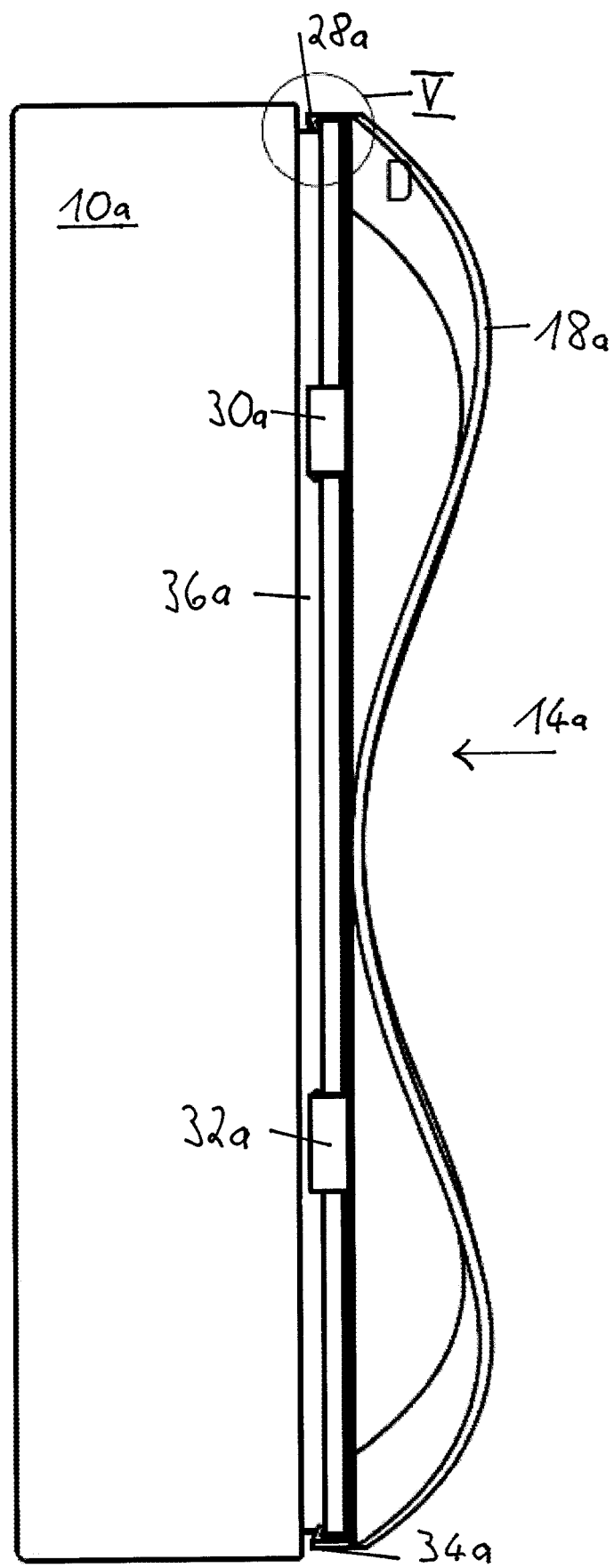
FIG. 4 is a side view in a radial direction of a part of a bearing unit according to the present disclosure.
Figure 5:
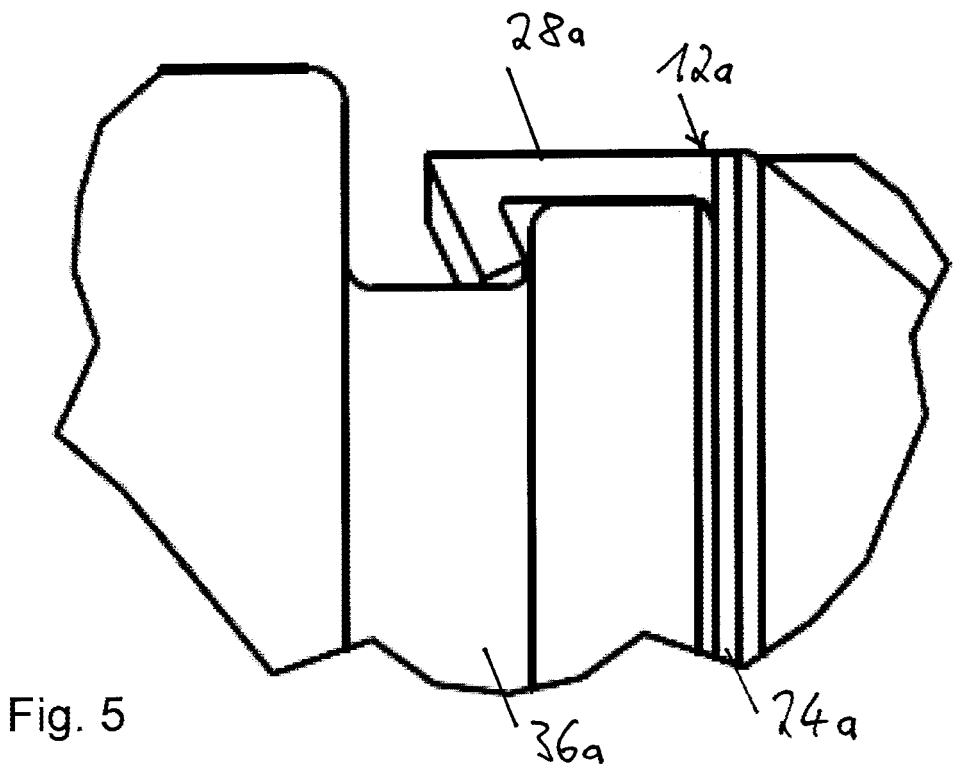
FIG. 5 is an enlarged view of partial region V in FIG. 4.
Figure 6:
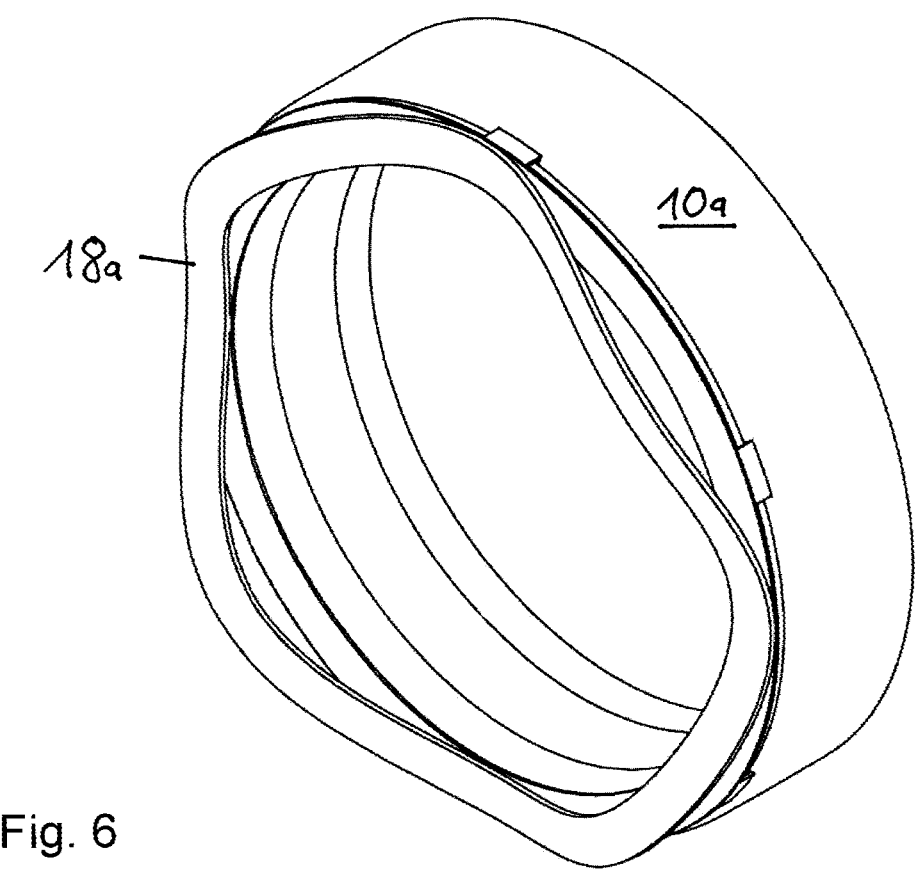
FIG. 6 is a perspective view of the part of the disclosed bearing unit.

In FIGS. 4 to 6 an alternative exemplary embodiment is depicted. Essentially identical components, features, and functions are generally numbered with the same reference numbers. However, to distinguish of the exemplary embodiments, the letter "a" is added to the reference numbers of the exemplary embodiment in FIGS. 4-6. The following description is essentially limited to the differences relative to the exemplary embodiment in FIG. 1 to FIG. 3, wherein with respect to components, features, and functions remaining the same, reference can be made to the description of the exemplary embodiment in FIG. 1 to FIG. 3.

FIG. 4 shows an alternative exemplary embodiment of a bearing unit according to the present disclosure, in which a snap connection between a spring unit 12a and an outer ring 10a is formed by a plurality of snap lugs 28a, 30a, 32a, 34a and a groove 36a of the outer ring. The snap lugs are part of a carrier metal plate 24a of the spring unit. The snap lugs extend from a circumferential end edge of the axially extending leg of the spring unit and are formed such that the extend radially inward of this edge and radially inward of the axially extending leg. Furthermore, the snap lugs are uniformly spaced from one another in the circumferential direction of the outer ring. The snap lugs are hook-shaped and engage into the groove 36a. To release the snap connection between spring unit and outer ring, a plurality or all of the snap lugs are pushed radially outward so that at least a significant part of the carrier metal plate can be moved away from the outer ring, and finally can be completely released from the outer ring.

The carrier metal plate can be formed by a smoothed wave spring to which tabs for the formation of the snap lugs have been attached. In principle, it is also conceivable that in the manufacturing of a multi-step wave spring the lowest winding is embodied flat in order to provide the carrier metal plate.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Outer ring
12 Spring unit
14 Axial direction
16 Region
18 Wave spring
20 Spatial region
22 Intermediate space
24 Carrier metal plate
26 Snap-connection element
28 Snap lug
30 Snap lug
32 Snap lug
34 Snap lug
36 Groove

What is claimed is:

1. A bearing unit comprising:
at least one outer ring; and
at least one spring unit mounted axially adjacent to the at least one outer ring,
wherein the spring unit comprises a wave spring attached to a carrier plate, and
wherein the spring unit is connected to the at least one outer ring by a snap fit.

2. The bearing unit according to claim 1,
wherein the at least one outer ring includes an inner bore, and
wherein no portion of the spring overlies the inner bore.

3. The bearing unit according to claim 2,
wherein the carrier plate includes a rib extending circumferentially around the carrier plate and radially into a groove in the outer ring, and
wherein the wave spring is welded to the carrier plate.

4. The bearing unit according to claim 1,
wherein the carrier plate includes at least one snap connector, and
wherein the wave spring is welded to the carrier plate.

5. The bearing unit according to claim 1, wherein the wave spring is a single-turn wave spring.

6. The bearing unit according to claim 1,
wherein the snap fit is formed by a rib extending circumferentially around the spring unit and radially into a groove in the outer ring.

7. The bearing unit according to claim 1,
wherein the snap fit is formed by a plurality of snap lugs circumferentially spaced around the spring unit and extending radially into a groove in the outer ring.

8. The bearing unit according to claim 1, wherein the carrier plate is formed of metal and wherein the wave spring is welded to the carrier plate.

9. An electric motor or a generator comprising:
a housing,
a rotor, and
the bearing unit according to claim 1 supporting the rotor with respect to the housing.

10. The bearing unit according to claim 1,
wherein the carrier plate is annular.

11. The bearing unit according to claim 10,
wherein the carrier plate is metal.

12. The bearing according to claim 1,
wherein the carrier plate is metal.

13. A method comprising:
welding a wave spring to an annular mounting plate; and
snapping the annular mounting plate onto a bearing outer ring.

14. A bearing unit comprising:
at least one outer ring having a radially outer surface, the radially outer surface having a circumferentially extending groove, and at least one spring unit comprising a wave spring welded to an annular disk, the annular disk having a cylindrical flange and the cylindrical flange including a radially inwardly extending rib, wherein the rib projects into the circumferential groove to connect the at least one spring unit to the at least one outer ring with a snap fit.

15. The bearing unit according to claim 14, wherein the annular disk overlies an axially facing side of the outer ring and the cylindrical flange overlies the radially outer surface of the at least one outer ring.

16. The bearing unit according to claim 15, wherein the at least one outer ring includes an inner bore, and wherein no portion of the at least one spring unit overlies the inner bore.

17. The bearing unit according to claim 14, wherein the annular disk is metal.

\* \* \* \* \*